Parker & Copeland.
Waste Water Drain.
Nº 66,380. Patented Jul. 2, 1867.
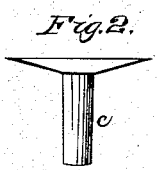
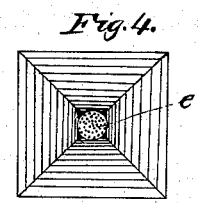
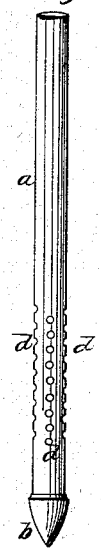
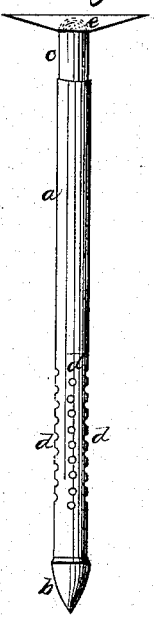
Witnesses:
Chas Foster
Fred. E. Knight
Inventors:
Charles H. Parker
G. N. Copeland

United States Patent Office.

CHARLES H. PARKER AND GEORGE N. COPELAND, OF CORTLAND, NEW YORK, ASSIGNORS TO CHARLES H. PARKER, OF THE SAME PLACE.

Letters Patent No. 66,380, dated July 2, 1867.

IMPROVEMENT IN DRAINS FOR WASTE WATER.

The Schedule referred to in these Letters Patent and making part of the same.

TO ALL WHOM IT MAY CONCERN:

Be it known that we, GEORGE N. COPELAND and CHARLES H. PARKER, of Cortland, in the State of New York, have invented a new and useful Improvement in the Method of Draining off or Disposing of Waste Water or other Liquids, whether from the roofs of builings, sinks, water-closets, or other receptacles.

The nature of our invention consists in providing a pipe of metal or wood with numerous perforations about its lower end to allow of the free escape of the liquid to be driven or sunken into the ground to such a depth that the lower end or perforated portion of the pipe shall have reached water or a porous stratum of earth, into which the waste liquid may be discharged. This point will be reached in some localities at a depth of eight or ten feet, in others it is necessary to go much deeper, say thirty to sixty feet. It has been found by actual trial that a pipe thus prepared, sunken fifteen feet and down to water, and but one and a half inch in diameter, will discharge and be relieved of all the water from a roof sixty by seventy feet in the longest and heaviest rains, the earth about the pipe at the surface showing no indications of water, and the water never backing or filling up the pipe above the surface of the ground.

To enable others skilled in the art to make and use our invention, I will proceed to describe its construction and operation, reference being had to the accompanying drawings, making a part of this specification, and in which a perspective view of the apparatus is given.

A is a metallic pipe, with perforations at $d\ d\ d$. A pointed plug, $b$, is inserted at the lower end, to assist, where the nature of the ground requires it, in clearing the way for the pipe, after the pipe is sunken to the desired depth. This point is driven out of the pipe by a rod let down inside the pipe. C represents the conductor which leads the liquid from a roof, sink, or other receptacle into the discharge pipe $a$. The lower end of this conductor should enter the discharge pipe, say four to eight inches, to prevent leakage at that point by settling of the pipe or heaving of the roof or sink, and the mouth of the conductor should be protected by a strainer to prevent the entrance of any solids.

What we claim, and desire to secure by Letters Patent, is—

1. The conducting waste water or other liquids into the earth by means of the pipe $a$, or its equivalent, either down to water or to a stratum of earth sufficiently porous to absorb or drain off such liquids.

2. We claim the pipe $a$, in combination with the conductor C and strainer $d$, (where such strainer shall be necessary,) as and for the purposes above described.

CHARLES H. PARKER,
G. N. COPELAND.

Witnesses:
CHAS. FOSTER,
FRED. E. KNIGHT.